United States Patent
Chen et al.

(10) Patent No.: US 12,326,621 B2
(45) Date of Patent: Jun. 10, 2025

(54) METHOD AND SYSTEM FOR GENERATING A ROBUST HIGHER-ORDER POINCARÉ SPHERE POLARIZATION STATE

(71) Applicant: SOOCHOW UNIVERSITY, Suzhou (CN)

(72) Inventors: Yahong Chen, Suzhou (CN); Zhen Dong, Suzhou (CN); Xi Sun, Suzhou (CN); Shilei Tan, Suzhou (CN); Fei Wang, Suzhou (CN); Yangjian Cai, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 18/011,182

(22) PCT Filed: Dec. 30, 2021

(86) PCT No.: PCT/CN2021/143110
§ 371 (c)(1),
(2) Date: Dec. 22, 2022

(87) PCT Pub. No.: WO2022/265225
PCT Pub. Date: Dec. 22, 2022

(65) Prior Publication Data
US 2024/0231131 A1    Jul. 11, 2024

(30) Foreign Application Priority Data
Dec. 22, 2021 (CN) .......................... 202111580731.4

(51) Int. Cl.
*G02F 1/01* (2006.01)
(52) U.S. Cl.
CPC .................. *G02F 1/0136* (2013.01)
(58) Field of Classification Search
CPC ...................................... G02F 1/0136
(Continued)

(56) References Cited

U.S. PATENT DOCUMENTS

2014/0161452 A1  6/2014  Okabe et al.
2020/0272100 A1  8/2020  Yu et al.

FOREIGN PATENT DOCUMENTS

| CN | 109270697 A | 1/2019 |
| CN | 111142266 A | 5/2020 |
| CN | 112804060 A | 5/2021 |

OTHER PUBLICATIONS

Kiaohui Ling et al., "Characterization and manipulation of full Poincaré beams on the hybrid Poincaré sphere" Journal of the Optical Society of America B, vol. 33, No. 11, pp. 2172-2176 (Oct. 4, 2016).

(Continued)

*Primary Examiner* — William Choi
(74) *Attorney, Agent, or Firm* — SZDC Law PC

(57) ABSTRACT

The invention provides a method and a system for generating a robust higher-order Poincaré sphere polarization state. The method includes: loading vortex phases into fully coherent vector beams for modulating them into left- and right-handed circularly polarized modes in a Poincaré sphere; synthesizing the left-handed and right-handed circularly polarized modes into a vector polarized light beam on the Poincaré sphere, and generating a polarization matrix of the Poincaré sphere; reducing the degree of spatial coherence of the polarized light, performing shaping to obtain a random electromagnetic beam, and simultaneously extracting polarization information in the polarization matrix and transferring the polarization information into a spatial correlation tensor of the random electromagnetic beam; and transmitting the random electromagnetic beam to a far field where the polarization information is transferred from the spatial correlation tensor into a polarization matrix of the random electromagnetic beam, to obtain a robust higher-order Poincaré sphere polarization state.

10 Claims, 3 Drawing Sheets

(58) Field of Classification Search
USPC .......................................................... 359/246
See application file for complete search history.

(56) References Cited

OTHER PUBLICATIONS

Giovanni Milione et al., "Higher-Order Poincaré Sphere, Stokes Parameters, and the Angular Momentum of Light" Physical Review Letters, vol. 5, No. 107, 052601 (Jul. 29, 2011).

left-handed circularly polarized light and right-handed circularly polarized light of generating a higher-order Poincaré sphere

synthesize a polarization matrix of the higher-order Poincaré sphere

generate a random electromagnetic beam and extract polarization informationinto into a spatial correlation tensor

transmit to a far field and obtain a robust higher-order Poincaré sphere polarization state

FIG. 1

METHOD AND SYSTEM FOR GENERATING A ROBUST HIGHER-ORDER POINCARÉ SPHERE POLARIZATION STATE

This application is the National Stage Application of PCT/CN2021/143110, filed on Dec. 30, 2021, which claims priority to Chinese Patent Application No. 202111580731.4, filed on Dec. 22, 2021, which is incorporated by reference for all purposes as if fully set forth herein.

FIELD OF THE INVENTION

The present invention relates to the field of information optical technologies, and specifically to a method and system for generating a robust higher-order Poincaré sphere polarization state.

DESCRIPTION OF THE RELATED ART

Polarization is an important degree of freedom for beam manipulation. Early research on polarized light focused on the simplest scalar polarized light. The polarization of scalar light, such as linearly polarized light, circularly polarized light, and elliptically polarized light, is consistent in different locations in space. Adequate research on scalar polarized beams has also given birth to devices such as 3D glasses and vehicle filter glasses, which have greatly improved people's quality of life. To better represent the polarization of scalar beams, in 1892, the French scientist, Poincaré, established the Poincaré sphere, in which he mapped the linear polarization states, elliptical polarization states, and circular polarization states with different spins to a sphere with the Stokes parameters as the coordinate system, and the south pole and the north pole of the sphere were respectively represented as the left-handed and right-handed circular polarization. This sphere was called the Poincaré sphere.

With the gradual development of polarization optics, the concept of vector polarized light was proposed. Unlike scalar polarized light, vector polarized light has different polarization states at different locations in space, which has higher research value and significance. The first experimentally generated vector polarized light is radially polarized vector light, whose polarization state is a linear polarization state satisfying circularly symmetric distribution. It is found through research that radially polarized light can generate a strong longitudinal light field component with a small range after passing through a high numerical aperture lens, which can be applied to optical etching, particle capture, and the like. Later, more and more novel vector light fields and novel vector polarization states such as hybrid polarized light fields, full-Poincaré sphere vector light fields, multi-singularity vector light fields have been proposed. A variety of novel vector light fields have been applied to optical information transfer, tight focus studies, and other fields. With the help of Poincaré's representation of scalar light—Poincaré sphere, the American scientist Milione established the first-order Poincaré sphere by using the left-handed and right-handed circularly polarized light carrying the first-order vortex as the north and south poles, and the classical vector polarization states—radial polarization and angular polarization are both first-order Poincaré sphere polarization states. However, higher-order Poincaré spheres carrying more topological charges have rarely been studied in terms of both generation methods and characterization. Higher-order Poincaré sphere polarized light has more complex polarization state distribution and can provide a wider range of application scenarios in tightly focused field shaping, information storage, and information transfer.

On the other hand, numerous studies have shown that the polarization state of a beam is easily disturbed by an external environment. For example, in the study by Qiwen Zhan et al. at the University of Dayton in 2009, it was found that when a fully coherent vector beam passes through atmospheric turbulence, the spot will be disturbed by turbulence, resulting in drift and flicker of the spot, and then the polarization state will be disrupted. When the propagation distance is larger and the turbulence is stronger, the polarization state is disrupted more severely. In the study by Gaofeng Wu et al. at Soochow University in 2014, it was found that radially polarized light will be disturbed by the blockage of an opaque obstacle. When the blockage area is larger, the change in the polarization state is larger. These phenomena lead to the fact that the polarization of a beam is limited by a transmission environment of the beam in practice. Unless in a vacuum environment, airflow and particulate dust in the air have some influence on beams. Therefore, how to generate a beam with a robust polarization state that is not easily damaged by the environment is particularly important in polarization optics research.

Commonly used existing methods for regulating and generating beam polarization are as follows.

In the simplest method, a polarization direction can be changed by adding a linear polarizer, a half-wave plate, and other devices to an optical path. The use of a quarter-wave plate can implement a change in a polarization type (for example, changing linear polarization into circular polarization). However, a complex vector polarized light field cannot be generated when only a linear polarizer and a wave plate are used to regulate polarization in the method.

For the generation of vector polarization, a radial/angular polarization converter may be used. The incident light is y-direction polarized light or x-direction polarized light. Radial or angular polarization can be directly generated in the output light. The radial/angular polarization converter can only convert linear polarization into radial polarization or angular polarization, and cannot generate other vector polarization states, leading to a small application range.

An x-y superimposition method may be used to generate more universal vector polarization. After a laser is first adjusted to polarized light in a 45° direction by using a linear polarizer, an x-direction component and a y-direction component of a beam are separated by using a polarized beam splitter. The x component and the y component are regulated separately by using a spatial light modulator. Next, the x-direction component and y-direction component after modulation are combined by using a polarized beam splitter to generate a vector polarization state beam. The x-y superimposition method can generate a higher-order Poincaré sphere polarization state and other vector polarization. However, the experimental operation is difficult and requires a polarized beam splitter. Both beam splitting and beam combining require high accuracy and stability, and the operation of separately regulating the x-direction component and the y-direction component is complex and prone to errors.

In addition, polarization states generated by using all existing methods do not have robustness and are easily disturbed by an external environment. For example, after atmospheric turbulence or blockage of an obstacle, the polarization states change drastically because the light intensity is damaged to varying degrees, and there are insurmountable defects in atmospheric optical communication and optical information transfer.

SUMMARY OF THE INVENTION

An objective of the present invention is to provide a method and system for generating a robust higher-order Poincaré sphere polarization state, to resolve existing problems that a higher-order Poincaré sphere polarized beam is difficult to generate, does not have robustness, and is prone to damage by an external environment.

To resolve the foregoing technical problems, the present invention provides a method for generating a robust higher-order Poincaré sphere polarization state, including the following steps:

S1: loading vortex phases into fully coherent vector beams for modulating them into left-handed circularly polarized light and right-handed circularly polarized light of a higher-order Poincaré sphere;

S2: synthesizing the left-handed circularly polarized light mode and the right-handed circularly polarized light mode into vector polarized light on the higher-order Poincaré sphere, and generating a polarization matrix of the higher-order Poincaré sphere through adjustment;

S3: reducing the degree of spatial coherence of the vector polarized light, performing shaping to obtain a random electromagnetic beam, and simultaneously extracting polarization information in the polarization matrix and transferring the polarization information into a spatial correlation tensor of the random electromagnetic beam; and S4: transmitting the random electromagnetic beam to a far field, where in the far field, the polarization information is transferred from the spatial correlation tensor into a polarization matrix of the random electromagnetic beam, to obtain a robust higher-order Poincaré sphere polarization state.

As a further improvement to the present invention, step S1 specifically includes the following steps:

S11: loading higher-order vortex phases into the fully coherent vector beams by using a spatial light modulator, and generating positive linearly polarized light and negative linearly polarized light with the higher-order vortex phases; and S12: filtering the positive linearly polarized light and the negative linearly polarized light to respectively obtain positive first-order vortex linearly polarized light and negative first-order vortex linearly polarized light for regulation into the right-handed circularly polarized light and the left-handed circularly polarized light, where the left-handed circularly polarized light and the right-handed circularly polarized light are respectively the south pole and the north pole of the higher-order Poincaré sphere.

As a further improvement to the present invention, step S2 specifically includes the following steps:

S21: using the south pole and the north pole of the higher-order Poincaré sphere as basic modes, where electric fields of the north pole and the south pole of an $l^{th}$-order Poincaré sphere are represented as:

$$E_N = \frac{\sqrt{2}}{2}\left(\frac{1}{\omega_0^2}\right) \exp\left(-\frac{v_x^2 + v_y^2}{\omega_0^2}\right)(v_x - iv_y)^l \begin{pmatrix} 1 \\ i \end{pmatrix}, \quad (1)$$

$$E_S = \frac{\sqrt{2}}{2}\left(\frac{1}{\omega_0^2}\right) \exp\left(-\frac{v_x^2 + v_y^2}{\omega_0^2}\right)(v_x + iv_y)^l \begin{pmatrix} 1 \\ -i \end{pmatrix}, \quad (2)$$

and where $E_N$ represents the electric field of the north pole, $E_S$ represents the electric field of the south pole, $\omega_0$ represents a waist width of a beam, $v=(v_x, v_y)$ represents a spatial position vector, $(v_x, v_y)$ represents vector coordinates, l represents an order number of the Poincaré sphere, that is, a topological charge of the vortex phase, and i is an imaginary number unit;

S22: superimposing the basic modes to synthesize polarized light at any point on the entire higher-order Poincaré sphere, where a superimposition manner of an electric field E at any point on the higher-order Poincaré sphere meets the following expression:

$$E = \frac{\sqrt{2}}{2}[E_N(\cos\theta + \sin\theta)(\cos\phi - i\sin\phi) + E_S(\cos\theta - \sin\theta)(\cos\phi + i\sin\phi)], \quad (3)$$

where θ and φ respectively represent an angle of pitch and an angle of deviation of the higher-order Poincaré sphere, and are respectively regulated by using an intensity ratio of the two basic modes and phase differences between components in an x direction and a y direction of a synthesized beam;

S23: obtaining the polarization matrix of the higher-order Poincaré sphere:

$$\Gamma(v, v) = \left(\frac{1}{\omega_0^2}\right) \exp\left[-\frac{2(v_x^2 + v_y^2)}{\omega_0^2}\right]\begin{pmatrix} \Gamma_{xx} & \Gamma_{xy} \\ \Gamma_{yx} & \Gamma_{yy} \end{pmatrix}, \quad (4)$$

and where $\Gamma_{xx}$, $\Gamma_{yy}$, $\Gamma_{xy}$, and $\Gamma_{yx}$, and TW are four matrix elements of the polarization matrix, which are respectively obtained by calculating the square of the absolute value of an electric field in the x direction, the square of the absolute value of an electric field in the y direction, a product of multiplying a complex conjugate of the electric field in the x direction by the electric field in the y direction, and a product of multiplying a complex conjugate of the electric field in the y direction by the electric field in the x direction, specifically represented as:

$$\Gamma_{xx} = -(MN^* + NM^*)ab + |M|^2 a^2 + |N|^2 b^2, \quad (5)$$

$$\Gamma_{xy} = (MN^* + NM^*)ab + |M|^2 b^2 + |N|^2 a^2, \quad (6)$$

$$\Gamma_{yx} = (|M|^2 - |N|^2)ab + MN^* a^2 - NM^* b^2, \text{ and} \quad (7)$$

$$\Gamma_{xx} = (|M|^2 - |N|^2)ab - MN^* a^2 + NM^* b^2, \quad (8)$$

where a and b are parameters related to the topological charge, and M and N are parameters related to the angle of pitch and the angle of deviation of the Poincaré sphere, specifically:

$$a = \frac{1}{2}[(v_x - iv_y)^l + (v_x + iv_y)^l], \quad (9)$$

$$b = \frac{i}{2}[(v_x - iv_y)^l - (v_x + iv_y)^l], \quad (10)$$

-continued $$M = \cos\phi\cos\theta - i\sin\phi\sin\theta, \text{ and} \quad (11)$$

$$N = \sin\phi\cos\theta + i\cos\phi\sin\theta; \quad (12)$$

and

S24: selecting the topological charge l, the angle of pitch θ, and the angle of deviation φ to obtain the polarized light at any point on the higher-order Poincaré sphere, that is, to obtain a corresponding polarization matrix.

As a further improvement to the present invention, step S3 specifically includes the following steps:

S31: focusing the polarization matrix and loading a rotating random phase screen to obtain a incoherent beam; and S32: performing a Fourier transform and Gaussian amplitude filtering and shaping on the incoherent beam to obtain the random electromagnetic beam, where the rotating random phase screen extracts the polarization information in the polarization matrix and transfers the polarization information into the spatial correlation tensor of the random electromagnetic beam, including the following steps:

in a space-frequency domain, a cross-spectral tensor of a random electromagnetic beam at a point $r=(r_x,r_y)$ in the space:

$$Q(r_1, r_2) = \begin{pmatrix} Q_{xx}(r_1, r_2) & Q_{xy}(r_1, r_2) \\ Q_{yx}(r_1, r_2) & Q_{yy}(r_1, r_2) \end{pmatrix}, \quad (13)$$

where $(r_x, r_y)$ represents coordinates of r, $Q_{xx}(r_1,r_2)$, $Q_{xy}(r_1,r_2)$, $Q_{yx}(r_1,r_2)$, and $Q_{yy}(r_1, r_2)$ are four elements of the cross-spectral tensor, $r_1$ and $r_2$ represent two position points in the space, and each element is written as an ensemble average of electric fields in the directions:

$$Q_{\alpha\beta}(r_1, r_2) = \langle E_\alpha^*(r_1)E_\beta(r_2) \rangle, \quad (14)$$

where $\alpha,\beta \in \{x,y\}$, x, and y represent two directions orthogonal to each other of the random electromagnetic beam, $E_\alpha(r_1)$ and $E_\beta(r_2)$ respectively represent random electric fields of a component α at a point $r_1$ and a component β at a point $r_2$ in the space, and * represents a complex conjugate, and $\langle (E^*_\alpha(r_1)E_\beta(r_2)) \rangle$ represents an ensemble average of $E^*_\alpha(r_1)$ and $E_\beta(r_2)$; and according to a positive definite condition, elements of the cross-spectral tensor of the random electromagnetic beam are represented as:

$$Q_{\alpha\beta}(r_1, r_2) = \int\int \Gamma_{\alpha\beta}(v_1, v_2) R_\alpha^*(r_1, v_1) R_\beta(r_2, v_2) d^2v_1 d^2v_2, \quad (15)$$

where $\Gamma_{\alpha\beta}(v_1, v_2)=\delta(v_1-v_2) E^*_\alpha(v_1)E_\beta(v_2)$ represents a matrix element extracted from the polarization matrix, $v=(v_x, v_y)$ represents a spatial position vector, $v_1$ and $v_2$ respectively represent position vectors at two points in the space, and δ represents a Dirac function; $R^\alpha(r_1, v_1)$ or $R_\beta(r_2, v_2)$ is represented as $R_{\alpha\beta}(r,v)$, and $R_{\alpha\beta}(r,v)$ represents a response function on a surface after the rotating random phase screen is loaded into Gaussian amplitude filtering, fixed as the following form of a Fourier transform:

$$R_{\alpha\beta}(r, v) = \frac{-iT(r)}{\lambda f} \exp\left[\frac{-i\pi}{\lambda f}(v^2 - 2r\cdot v)\right], \quad (16)$$

where $T(r)=\exp[-r^2/4\sigma_0^2]$ is a transmittance function of Gaussian amplitude filtering, $\sigma_0$ is a waist width of a beam of Gaussian amplitude filtering; λ is a wavelength, and f is a focal length;

Formula (16) is substituted into Formula (15) to obtain another expression of the cross-spectral tensor of the random electromagnetic beam:

$$Q(r_1, r_2) = \exp\left(-\frac{r_1^2 + r_2^2}{4\sigma_0^2}\right) S\left[-\frac{(r_2 - r_1)}{\lambda f}\right], \quad (17)$$

where $S[-(r_2-r_1)/\lambda f]$ represents the spatial correlation tensor of the random electromagnetic beam, and the spatial correlation tensor and the polarization matrix have the following relationship:

$$S\left[-\frac{(r_2 - r_1)}{\lambda f}\right] = \frac{1}{\lambda^2 f^2}\int \Gamma(v, v) \exp\left[\frac{i2\pi v (r_2 - r_1)}{\lambda f}\right]d^2v, \quad (18)$$

and that is, the polarization information included in the polarization matrix Γ(v,v) is transferred into the spatial correlation tensor $S[-(r_2-r_1)/\Delta f]$.

As a further improvement to the present invention, the transmission of the random electromagnetic beam in the far field in step S4 meets a vector Collins integral formula:

$$Q(\rho_1, \rho_2) = \frac{k^2}{4\pi^2 B^2} \int\int Q(r_1, r_2) \exp\left(-\frac{ikA}{2B}r_1^2 + \frac{ik}{B}r_1\cdot\rho_1 - \frac{ikD}{2B}\rho_1^2\right) \quad (19)$$

$$\exp\left(\frac{ikA}{2B}r_2^2 + \frac{ik}{B}r_2\cdot\rho_2 - \frac{ikD}{2B}\rho_2^2\right)d^2r_1 d^2r_2,$$

where $\rho=(\rho_x,\rho_y)$ represents a spatial position vector in a far-field plane, $\rho_1$ and $\rho_2$ respectively represent spatial position vectors of two points in the far-field plane, $k=2\pi/\lambda$ represents a wave number, and A, B, C, and D represent elements of an optical system transmitting ABCD, and are represented as:

$$\begin{pmatrix} A & B \\ C & D \end{pmatrix} = \begin{pmatrix} 1-z/f & z \\ -1/f & 1 \end{pmatrix}, \quad (20)$$

Formulas (17), (18), and (20) are substituted into Formula (19), a relationship $P(\rho,\rho)=Q(\rho,\rho)$ between the polarization matrix and the cross-spectral tensor is known, and it is obtained through operation that a convolution expression of a polarization matrix at a point in a far-field beam is:

$$P(\rho, \rho) = \frac{1}{\lambda^2 z^2}\left|\tilde{A}\left(-\frac{\rho}{\lambda z}\right)\right|^2 \otimes \Gamma\left(-\frac{\rho}{\lambda z}\right), \quad (21)$$

where $\tilde{A}(-\rho/\Delta z)$ is a Fourier transform of an amplitude function $A(r)=\exp(-r^2/4\sigma)\exp[ik(1-z/f)r^2/2z]$, $\Gamma(-\rho/\lambda z)$ is a Fourier transform of the spatial correlation tensor $S(r_2-r_1)$, ⊗ represents a convolution operation, and therefore the robust higher-order Poincaré sphere polarization state is obtained according to Formula (21).

A system for generating a robust higher-order Poincaré sphere polarization state includes:
- a polarized light generation assembly, configured to load a vortex phase into a fully coherent vector beam for regulation into left-handed circularly polarized light and right-handed circularly polarized light of a higher-order Poincaré sphere;
- a polarization matrix generation assembly, configured to synthesize the left-handed circularly polarized light and the right-handed circularly polarized light into vector polarized light on the higher-order Poincaré sphere, and generate a polarization matrix of the higher-order Poincaré sphere through adjustment;
- a random electromagnetic beam generation assembly, configured to reduce the degree of spatial coherence of the vector polarized light, perform shaping to obtain a random electromagnetic beam, and simultaneously extract polarization information in the polarization matrix and transfer the polarization information into a spatial correlation tensor of the random electromagnetic beam; and
- a higher-order Poincaré sphere polarization state generation assembly, configured to transmit the random electromagnetic beam to a far field, where in the far field, the polarization information is transferred from the spatial correlation tensor into a polarization matrix of the random electromagnetic beam, to obtain a robust higher-order Poincaré sphere polarization state.

As a further improvement to the present invention, the polarized light generation assembly includes a laser, a linear polarizer, a first spatial light modulator, a first lens, a first shading plate, a neutral density filter, a second lens, and a quarter-wave plate that are sequentially arranged;
- a fully coherent vector beam generated by the laser is regulated by the linear polarizer to generate a linearly polarized laser;
- a higher-order vortex phase is loaded into the linearly polarized laser by using the first spatial light modulator, and positive linearly polarized light and negative linearly polarized light with the higher-order vortex phase are generated; and
- the linearly polarized light sequentially passes through the first lens, the first shading plate, the neutral density filter, the second lens, and the quarter-wave plate, a positive first-order diffracted beam and a negative first-order diffracted beam are obtained from the linearly polarized light through filtering by the first shading plate, the quarter-wave plate and the linear polarizer adjust the positive first-order diffracted beam and the negative first-order diffracted beam into left-handed circularly polarized light and right-handed circularly polarized light through angle adjustment, the neutral density filter is configured to control an intensity ratio of the positive first-order diffracted beam and the negative first-order diffracted beam, and the first lens and the second lens form a 4f optical system.

As a further improvement to the present invention, the polarization matrix generation assembly includes a Ronchi grating, a second shading plate, a first half-wave plate, and a second half-wave plate that are sequentially arranged;
- the left-handed circularly polarized light and the right-handed circularly polarized light are focused by the 4f optical system to the Ronchi grating, and vector polarized light on the higher-order Poincaré sphere is synthesized by adjusting a position of the Ronchi grating and a cycle of loading a higher-order vortex phase into the first spatial light modulator; and
- the vector polarized light passes through the second shading plate to separate a central beam, and the polarization matrix of the higher-order Poincaré sphere is obtained from the central beam by adjusting an attenuation degree ratio of the neutral density filter and an angle between the first half-wave plate and the second half-wave plate.

As a further improvement to the present invention, the random electromagnetic beam generation assembly includes a third lens, a second spatial light modulator, a fourth lens, and a Gaussian amplitude filter that are sequentially arranged;
- a polarized beam generated after the polarization matrix is focused by the third lens enters the second spatial light modulator, and the second spatial light modulator is configured to reduce the degree of spatial coherence of the polarized beam and extract the polarization information in the polarization matrix; and
- the polarized beam is Fourier-transformed by the fourth lens and is shaped by the Gaussian amplitude filter to obtain the random electromagnetic beam, where the polarization information is transferred to the spatial correlation tensor of the random electromagnetic beam.

As a further improvement to the present invention, the higher-order Poincaré sphere polarization state generation assembly includes a fifth lens and a beam analyzer;
- the fifth lens focuses and transmits the random electromagnetic beam to the far field, and in the far field, the polarization information is transferred from the spatial correlation tensor into the polarization matrix of the random electromagnetic beam, and the higher-order Poincaré sphere polarization state is obtained according to the polarization matrix of the random electromagnetic beam; and
- the beam analyzer is arranged at a focus of the fifth lens in the far field, and is configured to measure the robust higher-order Poincaré sphere polarization state.

Beneficial effects of the present invention: In the method of the present invention, a higher-order Poincaré sphere optical polarization state is generated by loading a vortex phase into a vector beam and performing regulation and synthesis. The generated polarization state is stable and has a wide application range. Regulation is then performed by using a spatial correlation tensor of a random electromagnetic beam to implement the generation of a robust higher-order Poincaré sphere optical polarization state in a far field. The polarization state generated by using the method has high polarization purity and is not susceptible to the influence of a complex environment such as obstacles and turbulence in a transmission process, and can withstand the damage from a complex transmission environment such as the disturbance of atmospheric turbulence and blockage of obstacles.

In the system, a higher-order Poincaré sphere polarization state can be stably generated by using a spatial light modulator and a Ronchi grating addition, and a polarization state of fully coherent light is converted into a coherence structure of a random electromagnetic beam. A random electromagnetic beam generated through regulation can have anti-interference robustness in a polarization state of a far field. The overall optical path is simple, the operations are flexible, the application range is wide, and there is great significance for the research in fields such as optical communication in a complex environment.

BRIEF DESCRIPTION OF THE DRAWINGS

FIG. 1 is a schematic flowchart of a method according to the present invention;

Figure 2:
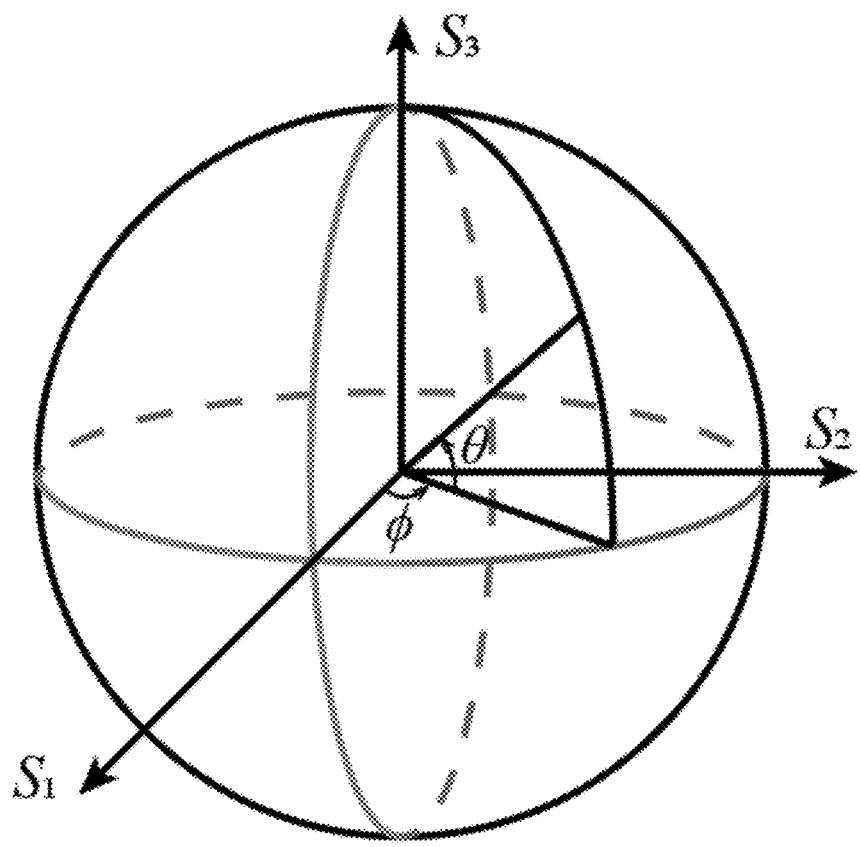
FIG. 2 is a schematic diagram of a higher-order Poincaré sphere.

REFERENCE NUMERALS 1. laser; 2. linear polarizer; 3. first spatial light modulator; 4. first lens; 5. first shading plate; 6. first neutral density filter; 7. second neutral density filter; 8. second lens; 9. first quarter-wave plate; 10. second quarter-wave plate; 11. Ronchi grating; 12. second shading plate; 13. first half-wave plate; 14. second half-wave plate; 15. third lens; 16. second spatial light modulator; 17. fourth lens; 18. Gaussian amplitude filter; 19. fifth lens; 20. beam analyzer; 21. first computer; and 22. second computer.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

Referring to FIG. 1, the present invention provides a method for generating a robust higher-order Poincaré sphere polarization state. The method includes the following steps:

S1: loading a vortex phase into a fully coherent vector beam for regulation into left-handed circularly polarized light and right-handed circularly polarized light of a higher-order Poincaré sphere;

S2: synthesizing the left-handed circularly polarized light and the right-handed circularly polarized light into vector polarized light on the higher-order Poincaré sphere, and generating a polarization matrix of the higher-order Poincaré sphere through adjustment;

S3: reducing the degree of spatial coherence of the vector polarized light, performing shaping to obtain a random electromagnetic beam, and simultaneously extracting polarization information in the polarization matrix and transferring the polarization information into a spatial correlation tensor of the random electromagnetic beam; and S4: transmitting the random electromagnetic beam to a far field, where in the far field, the polarization information is transferred from the spatial correlation tensor into a polarization matrix of the random electromagnetic beam, to obtain a robust higher-order Poincaré sphere polarization state.

In the present invention, a vortex phase is loaded into a fully coherent vector beam for regulation to generate vortex circularly polarized light at the north and south poles of a higher-order Poincaré sphere, and adjustment is performed to stably synthesize a polarization matrix of the higher-order Poincaré sphere. Next, through the regulation of a spatial correlation tensor, information contained in the polarization matrix is transferred into a spatial correlation tensor of a random electromagnetic beam. When being transferred to a far field, a degree of polarization of the random electromagnetic beam gradually increases, and the polarization information is transferred again into the polarization matrix of the random electromagnetic beam with a high degree of polarization. A robust higher-order Poincaré sphere polarization state is obtained according to the polarization matrix of the random electromagnetic beam with the high degree of polarization. This polarization state has robustness against environmental interference.

The specific principle is as follows:

As shown in FIG. 2, in a schematic diagram of a higher-order Poincaré sphere, the coordinate axes are respectively $S_1$, $S_2$, and $S_3$. $\theta$ and $\phi$ respectively represent an angle of pitch and an angle of deviation of the higher-order Poincaré sphere. When the order number of the higher-order Poincaré sphere is fixed, different angles of pitch and angles of deviation can correspond to different positions and different polarization states on the sphere.

First, a polarization matrix having a higher-order Poincaré sphere polarization state needs to be generated. The south pole (the left circular polarization) and the north pole (the right circular polarization) of the higher-order Poincaré sphere are used as basic modes to perform superimposition and synthesis to obtain polarization at any point on the entire sphere. Expressions of electric fields of the north pole and the south pole of an $l^{th}$-order Poincaré sphere may be represented as:

$$E_N = \frac{\sqrt{2}}{2}\left(\frac{1}{\omega_0^2}\right)\exp\left(-\frac{v_x^2+v_y^2}{\omega_0^2}\right)(v_x - iv_y)^l \begin{pmatrix} 1 \\ i \end{pmatrix}, \text{ and,} \quad (1)$$

$$E_S = \frac{\sqrt{2}}{2}\left(\frac{1}{\omega_0^2}\right)\exp\left(-\frac{v_x^2+v_y^2}{\omega_0^2}\right)(v_x + iv_y)^l \begin{pmatrix} 1 \\ -i \end{pmatrix}, \quad (2)$$

where $\omega_0$ represents a waist width of a beam, $v=(v_x,v_y)$ represents a spatial position vector, $(v_x, v_y)$ represents coordinates, l represents an order number of the Poincaré sphere, that is, a topological charge of the vortex phase, i is an imaginary number unit, and a superimposition manner of the electric field at any point on the higher-order Poincaré sphere meets the following expression:

$$E = \frac{\sqrt{2}}{2}[E_N(\cos\theta + \sin\theta)(\cos\phi - i\sin\phi) + E_S(\cos\theta - \sin\theta)(\cos\phi + i\sin\phi)], \quad (3)$$

where $\theta$ and $\phi$ respectively represent the angle of pitch and the angle of deviation of the higher-order Poincaré sphere shown in FIG. 2, and are respectively regulated by using an intensity ratio of the two basic modes and phase differences between components in an x direction and a y direction of a synthesized beam. The eventually obtained polarization matrix of the higher-order Poincaré sphere is:

$$\Gamma(u, v) = \left(\frac{1}{\omega_0^2}\right)\exp\left[-\frac{2(v_x^2+v_y^2)}{\omega_0^2}\right]\begin{pmatrix} \Gamma_{xx} & \Gamma_{xy} \\ \Gamma_{yx} & \Gamma_{yy} \end{pmatrix}, \quad (4)$$

where $\Gamma_{xx}$, $\Gamma_{yy}$, $\Gamma_{xy}$, and $\Gamma_{yx}$ are four matrix elements of the polarization matrix, which are respectively obtained by calculating the square of the absolute value of an electric field in the x direction, the square of the absolute value of an electric field in the y direction, a product of multiplying a complex conjugate of the electric field in the x direction by the electric field in the y direction, and a product of multiplying a complex conjugate of the electric field in the y direction by the electric field in the x direction, specifically represented as:

$$\Gamma_{xx} = -(MN^* + NM^*)ab + |M|^2 a^2 + |N|^2 b^2, \quad (5)$$

$$\Gamma_{xy} = (MN^* + NM^*)ab + |M|^2 b^2 + |N|^2 a^2, \quad (6)$$

$$\Gamma_{yx} = (|M|^2 - |N|^2)ab + MN^* a^2 - NM^* b^2, \text{ and} \quad (7)$$

$$\Gamma_{xx} = (|M|^2 - |N|^2)ab - MN^* a^2 + NM^* b^2. \quad (8)$$

In Formulas (5) to (8), the asterisk * and the double vertical bar ∥ respectively represents the conjugate operation and the absolute value calculation operation. a and b are parameters related to the topological charge, and M and N are parameters related to the angle of pitch and the angle of deviation of the Poincaré sphere, specifically:

$$a = \frac{1}{2}\left[(v_x - iv_y)^l + (v_x + iv_y)^l\right], \quad (9)$$

$$b = \frac{i}{2}\left[(v_x - iv_y)^l - (v_x + iv_y)^l\right], \quad (10)$$

$$M = \cos\phi\cos\theta - i\sin\phi\sin\theta, \quad (11)$$

$$N = \sin\phi\cos\theta + i\cos\theta\sin\theta. \quad (12)$$

In this way, the polarization state at any point on the higher-order Poincaré sphere may be obtained by choosing different topological charges l, angles of pitch θ, and angles of deviation φ. However, such a polarization state does not have robustness. The regulation using a spatial correlation tensor of a unpolarized random electromagnetic beam is further required to obtain a far-field higher-order Poincaré sphere polarization state.

In a space-frequency domain, a statistical characteristic of a random electromagnetic beam at a point $r=(r_x,r_y)$ (where $(r_x,r_y)$ is coordinates) in the space is usually represented by using the following cross-spectral tensor:

$$Q(r_1, r_2) = \begin{pmatrix} Q_{xx}(r_1, r_2) & Q_{xy}(r_1, r_2) \\ Q_{yx}(r_1, r_2) & Q_{yy}(r_1, r_2) \end{pmatrix}, \quad (13)$$

where $Q_{xx}(r_1,r_2)$, $Q_{xy}(r_1,r_2)$, $Q_{yx}(r_1,r_2)$, and $Q_{yy}(r_1,r_2)$ are four elements of the cross-spectral tensor, $r_1$ and $r_2$ represent different locations, and each element may be written as an ensemble average of electric fields in different directions:

$$Q_{\alpha\beta}(r_1, r_2) = \langle E_\alpha^*(r_1) E_\beta(r_2) \rangle, \quad (14)$$

where α,β∈{x, y}, x, and y represent two directions orthogonal to each other of the random electromagnetic beam, $E_\alpha(r_1)$ and $E_\beta(r_2)$ respectively represent random electric fields of a component α at a point $r_1$ and a component β at a point $r_2$ in the space, and the superscript asterisk and the angle brackets respectively represent a complex conjugate and an ensemble average. In addition, according to a positive definite condition, elements of the cross-spectral tensor of the random electromagnetic beam may further be represented as:

$$Q_{\alpha\beta}(r_1, r_2) = \int\int \Gamma_{\alpha\beta}(v_1, v_2) R_\alpha^*(r_1, v_1) R_\beta(r_2, v_2) d_{v_1}^2 d_{v_2}^2, \quad (15)$$

where $\Gamma_{\alpha\beta}(v_1, v_2)=\delta(v_1-v_2)E^*_\alpha(v_1)E_\beta(v_2)$ represents a matrix element extracted from the polarization matrix, $v=(v_x, v_y)$ represents a spatial vector in the space, $v_1$ and $v_2$ respectively represent position vectors at two points in the space, and δ represents a Dirac function; $R_{\alpha\beta}(r,v)$ is equal to $R_\alpha(r_1, v_1)$ or $R_\beta(r_2, v_2)$, and represents a response function on a surface after the random phase screen is loaded into Gaussian filtering, which may be fixed as the following form of a Fourier transform:

$$R_{\alpha\beta}(r, v) = \frac{-iT(r)}{\lambda f} \exp\left[\frac{-i\pi}{\lambda f}(v^2 - 2r\cdot v)\right], \quad (16)$$

where $T(r)=\exp[-r^2/4\sigma_0^2]$ is a transmittance function of Gaussian filtering, $\sigma_0$ is a waist width of a beam of Gaussian filtering; λ is a wavelength, and f is a focal length;

another expression of the cross-spectral tensor of the random electromagnetic beam may be obtained by substituting Formula (16) into Formula (15):

$$Q(r_1, r_2) = \exp\left(-\frac{r_1^2 + r_2^2}{4\sigma_0^2}\right) S\left[-\frac{(r_2 - r_1)}{\lambda f}\right], \quad (17)$$

where $S[-(r_2-r_1)/\lambda f]$ represents the spatial correlation tensor of the random electromagnetic beam, which is a physical amount used for describing the correlation between two points in space, and the spatial correlation tensor and the polarization matrix have the following relationship:

$$S\left[-\frac{(r_2 - r_1)}{\lambda f}\right] = \frac{1}{\lambda^2 f^2} \int \Gamma(v, v) \exp\left[\frac{i2\pi v(r_2 - r_1)}{\lambda f}\right] d^2 v, \quad (18)$$

and

As can be known from Formula (18), the polarization information included in the polarization matrix Γ(v,v) may be transferred into the spatial correlation tensor $S[-(r_2-r_1)/\lambda f]$. Further, the transmission of the random electromagnetic beam is studied by using a vector Collins integral formula:

$$Q(\rho_1, \rho_2) = \frac{k^2}{4\pi^2 B^2} \int\int Q(r_1, r_2) \exp\left(-\frac{ikA}{2B}r_1^2 + \frac{ik}{B}r_1\cdot\rho_1 - \frac{ikD}{2B}\rho_1^2\right) \quad (19)$$

$$\exp\left(\frac{ikA}{2B}r_2^2 + \frac{ik}{B}r_2\cdot\rho_2 - \frac{ikD}{2B}\rho_2^2\right) d^2 r_1 d^2 r_2,$$

where $\rho=(\rho_x, \rho_y)$ represents a spatial position vector in a far-field plane, $\rho_1$ and $\rho_2$ respectively represent spatial position vectors of two points in the far-field plane, $k=2\pi/\lambda$ represents a wave number, and A, B, C, and D represent elements of an optical system transmitting ABCD, and the optical system transmitting ABCD may be represented as:

$$\begin{pmatrix} A & B \\ C & D \end{pmatrix} = \begin{pmatrix} 1 - z/f & z \\ -1/f & 1 \end{pmatrix}, \quad (20)$$

and

Formulas (17), (18), and (20) are substituted into Formula (19), a relationship $P(\rho,\rho)=Q(\rho,\rho)$ between the beam polarization matrix and the cross-spectral tensor is known, and it may be obtained through complex operation that a convolution expression of a polarization matrix at a point in a far-field beam is:

$$P(\rho, \rho) = \frac{1}{\lambda^2 z^2} \left| \tilde{A}\left(-\frac{\rho}{\lambda z}\right) \right|^2 \otimes \Gamma\left(-\frac{\rho}{\lambda z}\right), \quad (21)$$

where $\tilde{A}(-\rho/\lambda z)$ is a Fourier transform of an amplitude function $A(r)=\exp(-r^2/4\sigma)\exp[ik(1-z/f)r^2/2z]$, $\Gamma(-\rho/\lambda z)$ is in fact a Fourier transform of the spatial correlation tensor $S(r_2-r_1)$, $\otimes$ represents a convolution operation, and therefore it may be known from according to Formula (21) that the robust higher-order Poincaré sphere polarization state is obtained. That is, the polarization information contained in the polarization matrix of the higher-order Poincaré sphere may be reflected in a polarization matrix of a new random electromagnetic beam in the far field.

The present invention further provides a system for generating a robust higher-order Poincaré sphere polarization state. The system for generating a robust higher-order Poincaré sphere polarization state includes:

a polarized light generation assembly, configured to load a vortex phase into a fully coherent vector beam for regulation into left-handed circularly polarized light and right-handed circularly polarized light of a higher-order Poincaré sphere;

a polarization matrix generation assembly, configured to synthesize the left-handed circularly polarized light and the right-handed circularly polarized light into vector polarized light on the higher-order Poincaré sphere, and generate a polarization matrix of the higher-order Poincaré sphere through adjustment;

a random electromagnetic beam generation assembly, configured to reduce the degree of spatial coherence of the vector polarized light, perform shaping to obtain a random electromagnetic beam, and simultaneously extract polarization information in the polarization matrix and transfer the polarization information into a spatial correlation tensor of the random electromagnetic beam; and a higher-order Poincaré sphere polarization state generation assembly, configured to transmit the random electromagnetic beam to a far field, where in the far field, the polarization information is transferred from the spatial correlation tensor into a polarization matrix of the random electromagnetic beam, to obtain a robust higher-order Poincaré sphere polarization state.

Figure 3:
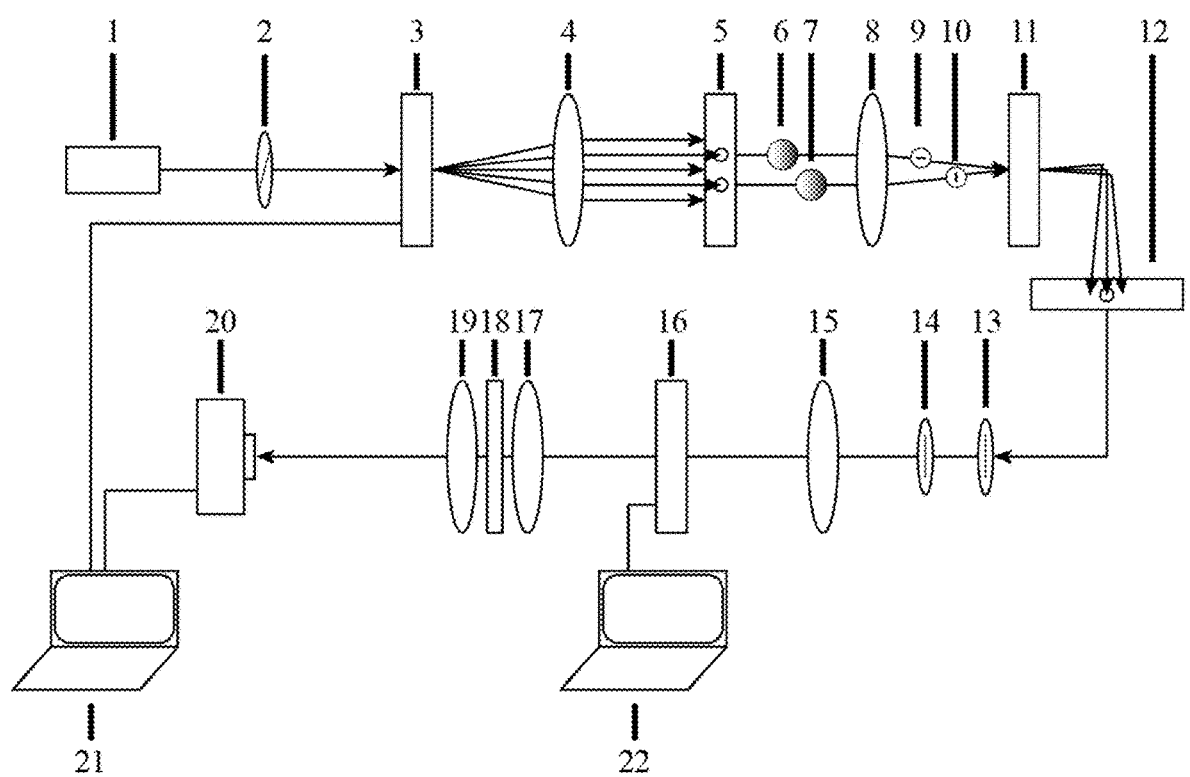
FIG. 3 is a schematic diagram of an optical path established in a system according to the present invention.

During implementation, as shown in FIG. 3, an optical path required for the system for generating a robust higher-order Poincaré sphere polarization state is established. A method for generating a robust higher-order Poincaré sphere polarization state includes the following steps:

In a first step, a laser 1 is turned on. The direction of a transmission axis of a linear polarizer 2 is rotated to control the intensity and polarization direction after a laser passes through the linear polarizer. The laser from the linear polarizer then passes through a first spatial light modulator 3. The first spatial light modulator 3 is connected to a first computer 21 and may load a higher-order vortex phase. In this case, positive linearly polarized light and negative linearly polarized light with the higher-order vortex phase are respectively obtained in a positive direction and a negative direction of a generated diffracted beam.

In a second step, the beam continues to pass through a 4f optical system formed by a first lens 4 and a second lens 8. A first shading plate 5 only allows a positive first-order diffracted beam and a negative first-order diffracted beam to pass through. An adjustable first neutral density filter 6 and an adjustable second neutral density filter 7 may control an intensity ratio of the two beams of light. The fast axes of the first quarter-wave plate 9 and the second quarter-wave plate 10 respectively form a 45° angle and a 135° angle with the transmission axis of a linear polarizer 2. In this way, the positive first-order diffracted beam and the negative first-order diffracted beam are changed from linear polarization into right and left circular polarization.

In a third step, the two beams of light are focused by the 4f system to a Ronchi grating 11. Polarized light at a location on the higher-order Poincaré sphere may be synthesized by adjusting the location of the Ronchi grating 11 and a cycle parameter of loading a vortex phase into the first spatial light modulator 3. A second shading plate 12 separates a central beam. The location of the generated polarization state on the higher-order Poincaré sphere may be changed by adjusting attenuation degree ratios of the first neutral density filter 6 and the second neutral density filter 7 and an angle between the first half-wave plate 13 and the second half-wave plate 14. Therefore, after processing by the second half-wave plate 14, an expected optical polarization matrix of any higher-order Poincaré sphere may be obtained.

In a fourth step, through the focusing of a third lens 15, the beam is irradiated to a second spatial light modulator 16. The second spatial light modulator 16 is connected to a second computer 22, is loaded with a rotating random phase screen, and is configured to reduce the degree of spatial coherence of the beam and extract polarization information contained in a beam polarization matrix.

In a fifth step, a distance between a fourth lens 17 and the second spatial light modulator 16 is a focal length of the fourth lens to implement a Fourier transform. A incoherent beam that contains polarization information passes through the fourth lens 17 and is then shaped by a Gaussian amplitude filter 18 to obtain a unpolarized random electromagnetic beam. The polarization information of the beam is transferred into the spatial correlation tensor.

In a sixth step, the function of a fifth lens 19 is focusing a random electromagnetic beam. In this process, the degree of polarization of the unpolarized random electromagnetic beam gradually increases. The polarization information is transferred from the spatial correlation tensor into a polarization matrix of a new random electromagnetic beam with a high degree of polarization. A focal plane of the fifth lens 19 may be considered as an infinitely far location of beam transmission. A beam analyzer 20 placed here may measure a higher-order Poincaré sphere polarization state, and the polarization state in this case has robustness and can withstand interference from an external environment.

That is, the entire system is divided into three parts: The first part needs to generate a polarization matrix of a higher-order Poincaré sphere. This part needs to load a vortex phase by using the first spatial light modulator 3, to obtain positive first-order vortex linearly polarized light and negative first-order vortex linearly polarized light through filtering and respectively perform regulation to obtain right and right-handed circularly polarized light. The two beams of light are combined into vector polarized light. An expected optical polarization matrix of a higher-order Poincaré sphere may be generated by using a combination of the adjustable first neutral density filter 6, the adjustable second neutral density filter 7, the first half-wave plate 13, and the second half-wave plate 14.

The second part needs to regulate the spatial correlation tensor. The information contained in the polarization matrix is transferred into a spatial correlation tensor of a unpolarized random electromagnetic beam. This part needs to first load a random phase screen by using the second spatial light modulator 16 to reduce the the degree of spatial coherence of the beam and extract polarization information. Next, a unpolarized spatial correlation tensor having polarization information of a higher-order Poincaré sphere is generated after processing by a system formed by the thin fourth lens 17 and the Gaussian filter 18.

The third part transmits a special spatial correlation tensor that is not polarized but has polarization information to a far field. A process of transmission to the far field is a process of directly reflecting the polarization information from the spatial correlation tensor into a polarization matrix of a random electromagnetic beam with a new high degree of polarization again. This part requires focusing of the unpolarized random beam by the thin fifth lens 19. The beam analyzer 20 may be placed at a focal length to measure a robust higher-order Poincaré sphere optical polarization state.

In combination with the principle formulas in the method, the polarization matrix shown in Formula (4) is generated by an optical system from the first spatial light modulator 3 to the second half-wave plate 14. In this way, the polarization state at any point on the higher-order Poincaré sphere may be obtained by choosing different topological charges l, angles of pitch θ, and angles of deviation $\Gamma_{\alpha\beta}(v_1, v_2)=\delta(v_1-v_2)E^*_\alpha(v_1)E_\beta(v_2)$ represents a matrix element extracted from the polarization matrix by the second spatial light modulator 16, $v=(v_x,v_y)$ represents a spatial vector on the surface of the second spatial light modulator 16, and δ represents a Dirac function. $R_{\alpha\beta}(r,v)$ represents a response function on a surface after the random phase screen is loaded from the second spatial light modulator 16 into the Gaussian filter 18, which may be fixed as the following form of a Fourier transform in Formula (16). $T(r)=\exp[-r^2/4\sigma_0^2]$ in Formula (16) is a transmittance function of the Gaussian filter 18, $\sigma_0$ is a waist width of a beam of the Gaussian filter 18; and λ is a wavelength, and f is a focal length of the thin fourth lens 17. The optical system from the second spatial light modulator 16 to the Gaussian filter 18 may transfer the polarization information included in the polarization matrix $\Gamma(v,v)$ into the spatial correlation tensor $S[-(r_2-r_1)/\lambda f]$. After the beam passes through a combined apparatus of the second spatial light modulator 16, the thin fourth lens 17, and the Gaussian amplitude filter 18, the cross-spectral tensor satisfying Formula (17) may be obtained. When the beam is focused by the thin fifth lens 19 and continues to be transferred to a far field (a focusing field in the experiment), the polarization matrix satisfying Formula (21) may be obtained. In this case, a higher-order Poincaré sphere polarization state can be obtained. In addition, because the polarization information is concealed in the spatial correlation tensor in a transmission process, such a polarization state may further have excellent robustness against environmental interference.

EMBODIMENT

This embodiment provides a system for generating a higher-order Poincaré sphere polarization state. Based on the foregoing method for generating a higher-order Poincaré sphere polarization state, a specific generation process is as follows by using a robust $3^{rd}$-order Poincaré sphere petal polarization state as an example:

As shown in FIG. 3, the laser 1 is a helium-neon laser with a wavelength of 532 nanometers, and can emit a vertically polarized laser. The linear polarizer 2 with a transmission axis forming a 45° angle with the vertical direction is placed after the laser 1, and may reduce the light intensity and adjusting the polarization direction of the beam to form a 45° angle with the vertical direction. The apparatus from the first spatial light modulator 3 to the second half-wave plate 14 is configured to generate a polarization matrix in a polarization state at a $3^{rd}$-order Poincaré sphere θ=0,ϕ=0 The apparatus from the thin third lens 15 to the Gaussian amplitude filter 18 is configured to transfer the polarization information of the polarization matrix into the spatial correlation tensor. The system from the thin fifth lens 19 to the beam analyzer 20 is configured to transmit the random electromagnetic beam to a focal field (a far field). At the focal field (the far field), the polarization information can be further transferred from the spatial correlation tensor into a polarization matrix of a new random electromagnetic beam, so that a robust $3^{rd}$-order Poincaré sphere petal polarization state can be obtained at the focal field (the far field).

Both the first spatial light modulator 3 and the second spatial light modulator 16 are transmission-type spatial light modulators with specific parameters including a horizontal resolution of 1024, a vertical resolution of 768, and a pixel size of 18 um×18 um. The holograms of the $3^{rd}$-order vortex phase loaded by the first spatial light modulator 3 and the rotating random phase screen loaded in the second spatial light modulator 16 are respectively obtained through operation by the first computer 21 and the second computer 22 installed with the software MATLAB®. Specific parameters of the beam analyzer 20 include a horizontal resolution of 1928, a vertical resolution of 1448, and a pixel size of 3.69 um×3.69 um, and is controlled by the first computer 21 installed with the software BeamGage®.

Specific measurement steps are as follows:

In a first step, as shown in FIG. 3, an optical path required for the experiment is established.

In a second step, a fully coherent vector light source 1 is turned on. The direction of the transmission axis of the linear polarizer 2 is rotated to form a 45° angle with the vertical direction. Next, the beam continues to pass through the first spatial light modulator 3. The first spatial light modulator 3 is connected to the first computer 21 and loads a hologram of a $3^{rd}$-order vortex phase. The hologram is generated by using an interference method. The overall grating transmission function is J=1+K/2. K=cos(kX+L) is an interference item. k=760π/1.1199 is a period parameter and is a quantity of attempting to successfully matching the Ronchi grating 11. X is a spatial coordinate of the hologram. L is an expression of the $3^{rd}$-order vortex phase. In this case, a spot emitted from the first spatial light modulator 3 is positive linearly polarized light and negative linearly polarized light with the $3^{rd}$-order vortex phase.

In a third step, the beam continues to pass through the 4f optical system formed by the first lens 4 and the second lens 8. The first shading plate 5 only allows a positive first-order diffracted beam and a negative first-order diffracted beam to pass through. The two adjustable neutral density filters are both adjusted to a transparent state to allow the two beams of light to pass through with the maximum light intensity. The fast axes of the first quarter-wave plate 9 and the second quarter-wave plate 10 are respectively perpendicular and parallel to the vertical direction. In this way, the polarized states of a positive first-order spot and a negative first-order spot can be changed from linear polarization into right and left circular polarization.

In a fourth step, the two beams of light are focused by the 4f system to the Ronchi grating 11. The location of the Ronchi grating 11 needs to be strictly located at the focal length of the thin second lens 8, to ensure that the positive first-order diffracted beam and the negative first-order diffracted beam can be fully combined. In addition, one beam of fully coherent vector light having a polarization state on the equator of a higher-order Poincaré sphere may be synthesized by matching the period parameter of the $3^{rd}$-order vortex phase loaded in the first spatial light modulator 3. The second shading plate 12 only allows the central beam to pass through. The first half-wave plate 13 and the second half-wave plate 14 are rotated to make the fast axes thereof to be parallel, so that a polarization matrix having a petal polarization state at a point $\theta=0, \phi=0$ of the $3^{rd}$-order Poincaré sphere may be obtained.

In a fifth step, the polarization information of the fully coherent vector beam is transferred into a spatial correlation tensor of the random electromagnetic beam. Through the focusing of the third lens 15, the $3^{rd}$-order Poincaré sphere polarized beam is irradiated to the second spatial light modulator 16. The second spatial light modulator 16 is connected to the second computer 22, is loaded with a rotating random phase screen, where the random phase screen is generated by using a "Random" statement built in the software MATLAB®, and is configured to extract polarization information of a beam and generate a spatial correlation tensor. It needs to be ensured here that a waist width of a fully coherent beam in an incident plane of the second spatial light modulator 16 is much greater than a pixel size of the second spatial light modulator 16.

In a sixth step, through the Fourier transform of the fourth lens 17 and the shaping of the Gaussian amplitude filter 18, the cross-spectral tensor represented in Formula (17) may be obtained, as shown in Formula (18). In this case, the spatial correlation tensor of the formed random electromagnetic beam includes the polarization information of the $3^{rd}$-order Poincaré sphere petal polarization state.

In a seventh step, the beam is focused by the fifth lens 19. The beam analyzer 20 is placed at a focal field of the fifth lens 19. The beam received by the beam analyzer 20 has the polarization matrix represented by Formula (21). In this case, the polarization state of the beam is a robust $3^{rd}$-order Poincaré sphere petal polarization state that can withstand interference from an external environment.

In the present invention, a higher-order Poincaré sphere polarization state can be stably generated by using a spatial light modulator and a Ronchi grating addition, and a polarization state of fully coherent light is converted into the spatial correlation tensor of a random electromagnetic beam. A random electromagnetic beam generated through regulation can have anti-interference robustness in a polarization state of a far field, and can withstand the damage from a complex transmission environment such as the disturbance of atmospheric turbulence and blockage of obstacles. Further, optical devices in the present invention are relatively common, the optical path is simple, the application range is wide, and there is great significance for the research in fields such as optical communication in a complex environment.

The foregoing embodiments are merely preferred embodiments used to fully describe the present invention, and the protection scope of the present invention is not limited thereto. Equivalent replacements or variations made by a person skilled in the art to the present invention all fall within the protection scope of the present invention. The protection scope of the present invention is as defined in the claims.

What is claimed is:

1. A method for generating a robust higher-order Poincaré sphere polarization state, comprising steps of:
   S1: loading vortex phases into fully coherent vector beams for modulating them into left-handed circularly polarized light and right-handed circularly polarized light of a higher-order Poincaré sphere;
   S2: synthesizing the left-handed circularly polarized light and the right-handed circularly polarized light into vector polarized light on the higher-order Poincaré sphere, and generating a polarization matrix of the higher-order Poincaré sphere through adjustment;
   S3: reducing the degree of spatial coherence of the vector polarized light, performing shaping to obtain a random electromagnetic beam, and simultaneously extracting polarization information in the polarization matrix and transferring the polarization information into a spatial correlation tensor of the random electromagnetic beam; and
   S4: transmitting the random electromagnetic beam to a far field, wherein in the far field, the polarization information is transferred from the spatial correlation tensor into a polarization matrix of the random electromagnetic beam, to obtain a robust higher-order Poincaré sphere polarization state.

2. The method for generating a robust higher-order Poincaré sphere polarization state according to claim 1, wherein step S1 comprises steps of:
   S11: loading higher-order vortex phases into the fully coherent vector beams by using a spatial light modulator, and generating positive linearly polarized light and negative linearly polarized light with the higher-order vortex phases; and
   S12: filtering the positive linearly polarized light and the negative linearly polarized light to respectively obtain positive first-order vortex linearly polarized light and negative first-order vortex linearly polarized light for modulating them into the right-handed circularly polarized light and the left-handed circularly polarized light, wherein the left-handed circularly polarized light and the right-handed circularly polarized light are respectively the south pole and the north pole of the higher-order Poincaré sphere.

3. The method for generating a robust higher-order Poincaré sphere polarization state according to claim 2, wherein step S2 comprises steps of:
   S21: using the south pole and the north pole of the higher-order Poincaré sphere as basic modes, wherein electric fields of the north pole and the south pole of an $l^{th}$-order Poincaré sphere are represented as:

$$E_N = \frac{\sqrt{2}}{2}\left(\frac{1}{\omega_0^2}\right)\exp\left(-\frac{v_x^2+v_y^2}{\omega_0^2}\right)(v_x - iv_y)^l \binom{1}{i}, \text{ and} \quad (1)$$

$$E_S = \frac{\sqrt{2}}{2}\left(\frac{1}{\omega_0^2}\right)\exp\left(-\frac{v_x^2+v_y^2}{\omega_0^2}\right)(v_x + iv_y)^l \binom{1}{-i}, \quad (2)$$

wherein $E_N$ represents the electric field of the north pole, $E_S$ represents the electric field of the south pole, $\omega_0$ represents a waist width of a beam, $v=(v_x, v_y)$ represents a spatial position vector, $(v_x, v_y)$ represents vector coordinates, l represents an order number of the Poincaré sphere, that is, a topological charge of the vortex phase, and i is an imaginary number unit;

S22: superimposing the basic modes to synthesize polarized light at any point on the entire higher-order Poincaré sphere, wherein a superimposition manner of an electric field E at any points on the higher-order Poincaré sphere meets the following expression:

$$E = \frac{\sqrt{2}}{2}[E_N(\cos\theta + \sin\theta)(\cos\phi - i\sin\phi) + E_S(\cos\theta - \sin\theta)(\cos\phi + i\sin\phi)], \quad (3)$$

wherein $\theta$ and $\phi$ respectively represent an angle of pitch and an angle of deviation of the higher-order Poincaré sphere, and are respectively regulated by using an intensity ratio of the two basic modes and phase differences between components along the x direction and the y direction of a synthesized beam;

S23: obtaining the polarization matrix of the higher-order Poincaré sphere:

$$\Gamma(v, v) = \left(\frac{1}{\omega_0^2}\right)\exp\left[-\frac{2(v_x^2+v_y^2)}{\omega_0^2}\right]\begin{pmatrix}\Gamma_{xx} & \Gamma_{xy}\\ \Gamma_{yx} & \Gamma_{yy}\end{pmatrix}, \quad (4)$$

wherein $\Gamma_{xx}, \Gamma_{yy}, \Gamma_{xy}$, and $\Gamma_{yx}$ are four matrix elements of the polarization matrix, which are respectively obtained by calculating the square of the absolute value of an electric field in the x direction, the square of the absolute value of an electric field in the y direction, a product of multiplying a complex conjugate of the electric field in the x direction by the electric field in the y direction, and a product of multiplying a complex conjugate of the electric field in the y direction by the electric field in the x direction, specifically represented as:

$$\Gamma_{xx} = -(MN^* + NM^*)ab + |M|^2 a^2 + |N|^2 b^2, \quad (5)$$

$$\Gamma_{xy} = (MN^* + NM^*)ab + |M|^2 b^2 + |N|^2 a^2, \quad (6)$$

$$\Gamma_{yx} = (|M|^2 - |N|^2)ab + MN^* a^2 - NM^* b^2, \text{ and} \quad (7)$$

$$\Gamma_{xx} = (|M|^2 - |N|^2)ab - MN^* a^2 + NM^* b^2, \quad (8)$$

wherein a and b are parameters related to the topological charge, and M and N are parameters related to the angle of pitch and the angle of deviation of the Poincaré sphere:

$$a = \frac{1}{2}[(v_x - iv_y)^l + (v_x + iv_y)^l], \quad (9)$$

$$b = \frac{i}{2}[(v_x - iv_y)^l - (v_x + iv_y)^l], \quad (10)$$

$$M = \cos\phi\cos\theta - i\sin\phi\sin\theta, \text{ and} \quad (11)$$

$$N = \sin\phi\cos\theta + i\cos\phi\sin\theta; \quad (12)$$

and

S24: selecting the topological charge l, the angle of pitch θ, and the angle of deviation φ to obtain the polarized light at any point on the higher-order Poincaré sphere, that is, to obtain a corresponding polarization matrix.

4. The method for generating a robust higher-order Poincaré sphere polarization state according to claim 1, wherein step S3 comprises steps of:

S31: focusing the polarization matrix and loading a rotating random phase screen to obtain an incoherent beam; and S32: performing a Fourier transform and Gaussian amplitude filtering and shaping on the incoherent beam to obtain the random electromagnetic beam, wherein the rotating random phase screen extracts the polarization information in the polarization matrix and transfers the polarization information into the spatial correlation tensor of the random electromagnetic beam, comprising steps of:

in a space-frequency domain, a cross-spectral tensor of a random electromagnetic beam at a point $r=(r_x, r_y)$ in the space:

$$Q(r_1, r_2) = \begin{pmatrix} Q_{xx}(r_1, r_2) & Q_{xy}(r_1, r_2) \\ Q_{yx}(r_1, r_2) & Q_{yy}(r_1, r_2) \end{pmatrix}, \quad (13)$$

wherein represents coordinates of r, $Q_{xx}(r_1,r_2)$, $Q_{xy}(r_1,r_2)$, $Q_{yx}(r_1,r_2)$, and $Q_{yy}(r_1, r_2)$ are four elements of the cross-spectral tensor, $r_1$ and $r_2$ represent two position points in the space, and each element is written as an ensemble average of electric fields in the directions:

$$Q_{\alpha\beta}(r_1, r_2) = \langle E_\alpha^*(r_1) E_\beta(r_2) \rangle, \quad (14)$$

wherein $\alpha, \beta \in \{x, y\}$, x, and y represent two directions orthogonal to each other of the random electromagnetic beam, $E_\alpha(r_1)$ and $E_\beta(r_2)$ respectively represent random electric fields of a component $\alpha$ at a point $r_1$ and a component $\beta$ at a point $r_2$ in the space, and * represents a complex conjugate, and $\langle E^*_\alpha(r_1)E_\beta(r_2)\rangle$ represents an ensemble average of $E^*_\alpha(r_1)$ and $E_\beta(r_2)$; and according to an nonnegative definite condition, elements of the cross-spectral tensor of the random electromagnetic beam are represented as:

$$Q_{\alpha\beta}(r_1, r_2) = \int\int \Gamma_{\alpha\beta}(v_1, v_2) R_\alpha^*(r_1, v_1) R_\beta(r_2, v_2) d_{v_1}^2 d_{v_2}^2, \quad (15)$$

wherein $\Gamma_{\alpha\beta}(v_1, v_2) = \delta(v_1 - v_2) E^*_\alpha(v_1) E_\beta(v_2)$ represents a matrix element extracted from the polarization matrix, $v=(v_x, v_y)$ represents a spatial position vector, $v_1$ and $v_2$ respectively represent position vectors at two points in the space, and $\delta$ represents a Dirac function; $R_\alpha(r_1, v_1)$ or $R_\beta(r_2, v_2)$ is represented as $R_{\alpha\beta}(r,v)$, and $R_{\alpha\beta}(r,v)$ represents a response function on a surface after the rotating random phase screen is loaded into Gaussian amplitude filtering, fixed as the following form of a Fourier transform:

$$R_{\alpha\beta}(r, v) = \frac{-iT(r)}{\lambda f}\exp\left[\frac{-i\pi}{\lambda f}(v^2 - 2r \cdot v)\right], \quad (16)$$

wherein T(r)=exp[−r²/4σ₀²] is a transmittance function of Gaussian amplitude filtering, $\sigma_0$ is a waist width of a beam of Gaussian amplitude filtering; $\lambda$ is a wavelength, and f is a focal length;

Formula (16) is substituted into Formula (15) to obtain another expression of the cross-spectral tensor of the random electromagnetic beam:

$$Q(r_1, r_2) = \exp\left(-\frac{r_1^2 + r_2^2}{4\sigma_0^2}\right) S\left[-\frac{(r_2 - r_1)}{\lambda f}\right], \quad (17)$$

wherein $S[-(r_2-r_1)/\lambda f]$ represents the spatial correlation tensor of the random electromagnetic beam, and the spatial correlation tensor and the polarization matrix have the following relationship:

$$S\left[-\frac{(r_2 - r_1)}{\lambda f}\right] = \frac{1}{\lambda^2 f^2} \int \Gamma(v, v) \exp\left[\frac{i2\pi v(r_2 - r_1)}{\lambda f}\right] d^2v, \quad (18)$$

and that is, the polarization information comprised in the polarization matrix $\Gamma(v,v)$ is transferred into the spatial correlation tensor $S[-(r_2-r_1)/\lambda f]$.

5. The method for generating a robust higher-order Poincaré sphere polarization state according to claim 1, wherein the transmission of the random electromagnetic beam in the far field in step S4 meets a vector Collins integral formula:

$$Q(\rho_1, \rho_2) = \frac{k^2}{4\pi^2 B^2} \int\int Q(r_1, r_2) \exp\left(-\frac{ikA}{2B}r_1^2 + \frac{ik}{B}r_1 \cdot \rho_1 - \frac{ikD}{2B}\rho_1^2\right), \quad (19)$$

$$\exp\left(\frac{ikA}{2B}r_2^2 + \frac{ik}{B}r_2 \cdot \rho_2 - \frac{ikD}{2B}\rho_2^2\right) d^2r_1 d^2r_2$$

wherein $\rho=(\rho_x, \rho_y)$ represents a spatial position vector in a far-field plane, $\rho_1$ and $\rho_2$ respectively represent spatial position vectors of two points in the far-field plane, $k=2\pi/\lambda$ represents a wave number, and A, B, C, and D represent elements of the transmitting ABCD matrix of an optical system, and are represented as:

$$\begin{pmatrix} A & B \\ C & D \end{pmatrix} = \begin{pmatrix} 1 - z/f & z \\ -1/f & 1 \end{pmatrix}, \quad (20)$$

Formulas (17), (18), and (20) are substituted into Formula (19), a relationship $P(\rho,\rho)=Q(\rho,\rho)$ between the polarization matrix and the cross-spectral tensor is known, and it is obtained through operation that a convolution expression of a polarization matrix at a point in a far-field beam is:

$$P(\rho, \rho) = \frac{1}{\lambda^2 z^2} \left|\tilde{A}\left(-\frac{\rho}{\lambda z}\right)\right|^2 \otimes \Gamma\left(-\frac{\rho}{\lambda z}\right), \quad (21)$$

wherein $\tilde{A}(-\rho/\lambda z)$ is a Fourier transform of an amplitude function $A(r)=\exp(-r^2/4\sigma)\exp[ik(1-z/f)r^2/2z]$, $\Gamma(-\rho/\lambda z)$ is a Fourier transform of the spatial correlation tensor $S(r_2-r_1)$, $\otimes$ represents a convolution operation, and therefore the robust higher-order Poincaré sphere polarization state is obtained according to Formula (21).

6. A system for generating a robust higher-order Poincaré sphere polarization state, comprising:
a polarized light generation assembly, configured to load vortex phases into fully coherent vector beams for modulating them into left-handed circularly polarized light and right-handed circularly polarized light of a higher-order Poincaré sphere;
a polarization matrix generation assembly, configured to synthesize the left-handed circularly polarized light and the right-handed circularly polarized light into vector polarized light beam on the higher-order Poincaré sphere, and generate a polarization matrix of the higher-order Poincaré sphere through adjustment;
a random electromagnetic beam generation assembly, configured to reduce the degree of spatial coherence of the vector polarized light, perform shaping to obtain a random electromagnetic beam, and simultaneously extract polarization information in the polarization matrix and transfer the polarization information into a spatial correlation tensor of the random electromagnetic beam; and
a higher-order Poincaré sphere polarization state generation assembly, configured to transmit the random electromagnetic beam to a far field, wherein in the far field, the polarization information is transferred from the spatial correlation tensor into a polarization matrix of the random electromagnetic beam, to obtain a robust higher-order Poincaré sphere polarization state.

7. The system for generating a robust higher-order Poincaré sphere polarization state according to claim 6, wherein the polarized light generation assembly comprises a laser, a linear polarizer, a first spatial light modulator, a first lens, a first shading plate, a neutral density filter, a second lens, and a quarter-wave plate that are sequentially arranged;
a fully coherent vector beam generated by the laser is regulated by the linear polarizer to generate a linearly polarized laser;
a higher-order vortex phase is loaded into the linearly polarized laser by using the first spatial light modulator, and positive linearly polarized light mode and negative linearly polarized light mode with the higher-order vortex phases are generated; and
the linearly polarized light sequentially passes through the first lens, the first shading plate, the neutral density filter, the second lens, and the quarter-wave plate, a positive first-order diffracted beam and a negative first-order diffracted beam are obtained from the linearly polarized light through filtering by the first shading plate, the quarter-wave plate and the linear polarizer adjust the positive first-order diffracted beam and the negative first-order diffracted beam into left-handed circularly polarized light and right-handed circularly polarized light through angle adjustment, the neutral density filter is configured to control an intensity ratio of the positive first-order diffracted beam and the negative first-order diffracted beam, and the first lens and the second lens form a 4f optical system.

8. The system for generating a robust higher-order Poincaré sphere polarization state according to claim 7, wherein the polarization matrix generation assembly comprises a Ronchi grating, a second shading plate, a first half-wave plate, and a second half-wave plate that are sequentially arranged;
the left-handed circularly polarized light and the right-handed circularly polarized light are focused by the 4f optical system to the Ronchi grating, and vector polarized light on the higher-order Poincaré sphere is synthesized by adjusting a position of the Ronchi grating and a cycle of loading a higher-order vortex phase by the first spatial light modulator; and the vector polarized light passes through the second shading plate to separate a central beam, and the polarization matrix of the higher-order Poincaré sphere is obtained from the central beam by adjusting an attenuation degree ratio of the neutral density filter and an angle between the first half-wave plate and the second half-wave plate.

9. The system for generating a robust higher-order Poincaré sphere polarization state according to claim 8, wherein the random electromagnetic beam generation assembly comprises a third lens, a second spatial light modulator, a fourth lens, and a Gaussian amplitude filter that are sequentially arranged;

a polarized beam generated after the polarization matrix is focused by the third lens enters the second spatial light modulator, and the second spatial light modulator is configured to reduce the degree of spatial coherence of the polarized beam and extract the polarization information in the polarization matrix; and the polarized beam is Fourier-transformed by the fourth lens and is shaped by the Gaussian amplitude filter to obtain the random electromagnetic beam, wherein the polarization information is transferred to the spatial correlation tensor of the random electromagnetic beam.

10. The system for generating a robust higher-order Poincaré sphere polarization state according to claim 9, wherein the higher-order Poincaré sphere polarization state generation assembly comprises a fifth lens and a beam analyzer;

the fifth lens focuses and transmits the random electromagnetic beam to the far field, and in the far field, the polarization information is transferred from the spatial correlation tensor into the polarization matrix of the random electromagnetic beam, and the higher-order Poincaré sphere polarization state is obtained according to the polarization matrix of the random electromagnetic beam; and the beam analyzer is arranged at a focus of the fifth lens in the far field, and is configured to measure the robust higher-order Poincaré sphere polarization state.

* * * * *